(12) United States Patent
Sen et al.

(10) Patent No.: US 10,172,041 B2
(45) Date of Patent: Jan. 1, 2019

(54) FACILITATION OF MOBILE DEVICE RESOURCE OPTIMIZATION

(71) Applicant: AT&T Intellectual Property I, L.P., Atlanta, GA (US)

(72) Inventors: Subhabrata Sen, New Providence, NJ (US); Oliver Spatscheck, Randolph, NJ (US); Junxian Huang, Suzhou (CN); Zhuoqing Morley Mao, Ann Arbor, MI (US); Feng Qian, Basking Ridge, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 390 days.

(21) Appl. No.: 14/560,580

(22) Filed: Dec. 4, 2014

(65) Prior Publication Data
US 2016/0165584 A1    Jun. 9, 2016

(51) Int. Cl.
*H04W 28/18* (2009.01)
*H04M 19/04* (2006.01)
*H04W 28/06* (2009.01)

(52) U.S. Cl.
CPC ......... *H04W 28/18* (2013.01); *H04M 19/047* (2013.01); *H04W 28/06* (2013.01)

(58) Field of Classification Search
CPC .................................................. H04W 72/048
See application file for complete search history.

(56) References Cited

U.S. PATENT DOCUMENTS

| | | | |
|---|---|---|---|
| 6,516,421 B1* | 2/2003 | Peters | G06F 1/3228 713/502 |
| 8,434,153 B2 | 4/2013 | Sundaramurthy et al. | |
| 2008/0086528 A1* | 4/2008 | Garg | G06F 11/3495 709/204 |
| 2008/0165116 A1* | 7/2008 | Herz | G09G 3/3406 345/102 |
| 2011/0177847 A1 | 7/2011 | Huang | |
| 2013/0163431 A1* | 6/2013 | Backholm | H04W 28/0273 370/235 |
| 2013/0201852 A1 | 8/2013 | Chou et al. | |
| 2013/0252674 A1 | 9/2013 | Hsieh et al. | |
| 2013/0294307 A1 | 11/2013 | Johansson et al. | |
| 2014/0036697 A1 | 2/2014 | Annan et al. | |

(Continued)

FOREIGN PATENT DOCUMENTS

| CN | 103118175 A | 5/2013 |
|---|---|---|
| CN | 103440031 A | 12/2013 |

OTHER PUBLICATIONS

Huang, "Performance and Power Characterization of Cellular Networks and Mobile Application Optimizations," 2013, 205 Pages, Copyright of Junxian Huang, Retrieved on Sep. 15, 2014.

(Continued)

*Primary Examiner* — Sulaiman Nooristany
(74) *Attorney, Agent, or Firm* — Amin, Turocy & Watson, LLP

(57) ABSTRACT

A more efficient mobile device can be achieved via an optimization process based on display screen dormancy. Application data transmissions can be throttled based on a screen-on or screen-off status of a mobile device. Furthermore, an application management platform can be used to prioritize application data transmissions based on data associated with each application's packet transmissions.

20 Claims, 12 Drawing Sheets

(56) References Cited

U.S. PATENT DOCUMENTS

| | | |
|---|---|---|
| 2014/0064171 A1 | 3/2014 | Zhou et al. |
| 2014/0195843 A1 | 7/2014 | Lai et al. |
| 2015/0055463 A1* | 2/2015 | Alisawi ............. H04W 28/0236 |
| | | 370/230 |
| 2015/0201378 A1* | 7/2015 | Song ................. H04W 52/0251 |
| | | 370/311 |

OTHER PUBLICATIONS

Huang, et al., "RadioProphet: Intelligent Radio Resource Deallocation for Cellular Networks," 2014, 11 Pages, Springer International Publishing, Switzerland, Retrieved on Sep. 15, 2014.

* cited by examiner

FACILITATION OF MOBILE DEVICE RESOURCE OPTIMIZATION

TECHNICAL FIELD

This disclosure relates generally to facilitating optimization of mobile device resources based on a display status associated with the mobile device and/or a prioritization related to mobile device applications.

BACKGROUND

Radio resource optimization is of interest for mobile internet service providers (ISPs) in efforts to maintain a high-quality user experience. Although battery capacity continues to be a basis for user selection of mobile devices, it is limited by physical constraints, such as size and weight, of the mobile device. In cellular networks, both 3G and 4G, the user equipment (UE), or mobile device, can stay in a high-power state occupying radio resources for a time duration before the allocated resource is released by the network and the UE enters into a low power state.

The time period, also known as the radio resource control (RRC) tail can prevent frequent state promotions (resource allocation), which can cause unacceptably long delay for the UE, as well as additional processing overhead for the radio access network. However, most contemporary mobile ISPs use a static and conservative setting of the tail time, which can be the cause of energy and radio resource inefficiency in both 3G and 4G networks.

The above-described background relating to radio resource optimization mechanisms is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
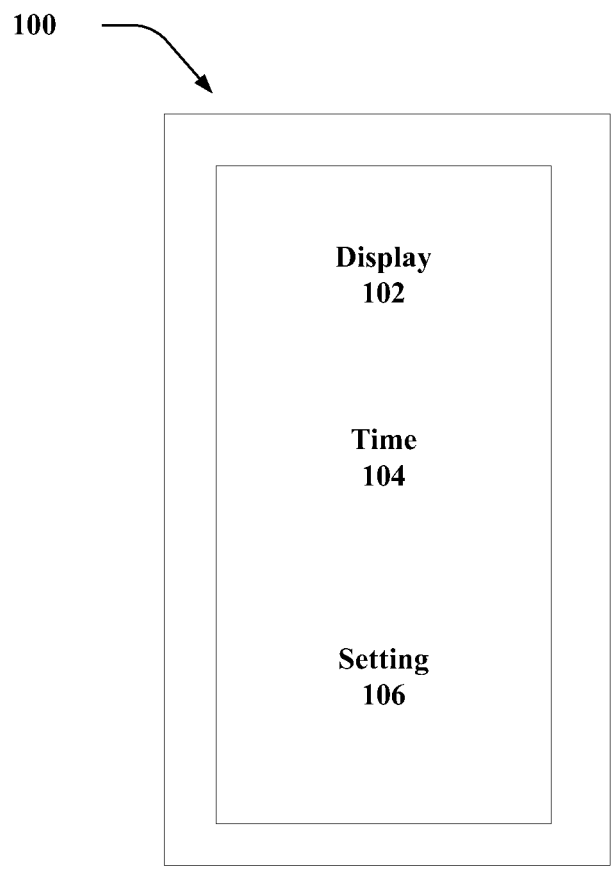
FIG. 1 illustrates a mobile device comprising a setting associated with a display screen according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above-identified deficiencies and other drawbacks of traditional mobile device resource management, various embodiments are described herein to facilitate optimization of mobile device resources based on the mobile device display and/or a prioritization scheme related to mobile device applications.

For simplicity of explanation, the methods (or algorithms) are depicted and described as a series of acts, it is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from an computer-readable device, carrier, or media, including a non-transitory computer readable storage medium.

Described herein are systems, methods, articles of manufacture, and other embodiments or implementations that can facilitate resource optimization of a mobile device. Mobile device resource optimization can be implemented in connection with any type of device with a connection to a communications network such as: a mobile handset, a computer, a handheld device, or the like.

In efforts to optimize mobile device efficiency, screen-off traffic can be treated differently than screen-on traffic. User and application behavior can have significant differences when a screen is on versus off, resulting in different traffic patterns. When the screen is off, there can be a higher chance that the user is not actively interacting with the device and the network traffic is most likely delay tolerant. Hence, optimizing the mobile device traffic using batching and fast dormancy can be done more aggressively. In contrast, when the screen is on, it can be harder to predict the delay sensitivity of the network traffic, and aggressive optimization can compromise the user experience.

Screen-aware optimization can be complementary to other efficiency optimization improvement efforts, e.g., better application design. Although it is important for individual mobile applications to be better designed, the power state on a mobile device is a function of the traffic pattern across applications. However, the screen-aware optimization can work across both optimized applications and suboptimal applications, such as legacy applications. Although the number of packets and total payload of screen-off traffic are smaller than that of screen-on traffic, screen-off traffic can consume a high percentage of the total network energy.

Evaluating optimization techniques using a long term evolution (LTE) model and fast dormancy, for the same parameter setting, can generate more energy savings and less signaling/delay overhead for screen-off traffic. Screen-aware optimization can achieve energy savings, reduction in signaling overhead, and a reduction in delay overhead.

A data set can be defined to comprise both cellular and Wi-Fi traces without any sampling for three types of data: (i) packet traces in tcpdump format including both headers and payload, (ii) the process name responsible for sending or receiving each packet by correlating a socket, inode, and process identification (ID) in real-time, and (iii) screen on/off status data with a sampling rate measured in Hz. To associate individual packets with screen status, a time window $[t_1, t_2]$ can be defined as a screen-on window if all screen samples in the window have screen-on status, and similarly a screen-off window can be defined. Packets can then be classified as screen-on packets if their timestamp falls into any screen-on window, and screen-off packets for screen-off windows. Packets that do not fall into any window can be marked as unknown. Unknown traffic can occur due to the missing screen status for some small time windows due to a collection error or a users' careless intervention.

A burst analysis traffic model can be used to understand screen-off traffic patterns. For each user, the traffic trace can be a sequence of network packets, represented by $P_i(1 \le i \le n)$. $P_i$ can be either downlink or uplink. If the timestamp of $P_i$ is defined to be $t_i$, the trace can be represented by $t_i \le t_j$ for any $i<j$. Using a burst threshold BT, the packets can be divided into bursts, i.e., $\{P_p, P_{p+1}, \ldots, P_q\}$ belonging to a burst B, if and only if: i) $t_{k+1}-t_k \le BT$ for any $k \in \{p, \ldots, q-1\}$, ii) $t_{q+1}-t_q>BT$, and iii) $t_p-t_p-1>BT$. The inter-burst time can be defined as IBT for burst B to be the time gap following this burst, i.e., $t_q+1-t_q$. The burst threshold can be empirically chosen to equal two seconds, which can be validated to be larger than most packet gaps for 3G/4G networks within a unit network transfer, e.g., downloading a web object via HTTP or resolving domain names via DNS.

Evaluating optimization performance can be assessed via network and power simulation. Since a 3G network has a similar network and power model as LTE 4G network, LTE can be chosen as a representative to understand the energy and radio resource overhead of a particular packet trace. To quantify optimization performance, three metrics can be defined energy (E), signal overhead (S), and user perceived scheduling delay (D). E can be the total user equipment network energy, which is the energy consumed by the device's cellular network interface and does not include the screen energy. The network can typically account for a third of energy drain on the phone. Given that E can be larger when the allocated radio resource is occupied by the user equipment for a longer duration, reducing E can be aligned with reducing the total occupation time of the radio resource. S can be defined as the signaling overhead, i.e., the number of radio resource control (RRC) promotions from RRC IDLE to RRC CONNECTED triggered by the packets in a specific trace. D can be the user-perceived channel scheduling delay, including promotions delay and waiting time.

Traffic optimization can be performed via two techniques: (1) fast dormancy; and (2) batching. Fast dormancy is an optimization mechanism in 3G network currently supported by some handsets. When user equipment has not observed any network activity for some idle time $T_i$, it can send a special RRC message to the network to make or request that the allocated radio resource be released earlier, instead of occupying for the whole RRC tail. After the radio resource is released, user equipment can switch to the low power idle state (RRC IDLE for LTE networks), saving energy. The setting of $T_i$ is important for balancing the tradeoff among user equipment energy saving ($\Delta E$), signaling overhead ($\Delta S$) and channel scheduling delay ($\Delta D$), i.e., a smaller $T_i$ can result in a larger $\Delta E$ at the cost of larger $\Delta S$ and $\Delta D$, and vice versa.

Batching is a widely used traffic shaping technique comprising two parameters, source window size $\alpha$ (seconds) and target window size $\beta$ (seconds). For each time window of a seconds, assume the range is $[t, t+\alpha]$, packets within $[t, t+\alpha-\beta]$ can be delayed and batched with those inside $[t+\alpha-\beta, t+\alpha]$. Packets within an alpha-second window can get transferred in the $\beta$-second window in the tail, without being bottlenecked by the network speed, since available bandwidth is typically underutilized by mobile applications. The aforementioned can be validated if the maximum throughput is found to be below the available 3G bandwidth, once the maximum throughput is calculated.

Some processes can have most of the payload transferred during screen-off sessions. This can be related with the background behaviors of specific applications, getting updates from servers periodically, or based on push notifications initiated by the server. In terms of the % of downlink payload, some applications can have a smaller proportion of their respective downlink payload in off-screen state than the other applications. This observation is further supported by the fact that these applications can have a smaller average downlink packet size, while other applications, can have a higher average downlink packet size. This can suggest that some processes are downloading objects with a relative large size, while other processes are communicating with remote hosts in some protocols that have much smaller downlink payload. Packets can be classified as screen-on, screen-off, or unknown if the packet does not belong to any screen session. The possible reasons for unknown packets are multifold, including that voluntary users may have accidentally killed the data collector. Packet payload size can be the bytes of an internet protocol (IP) packet without transmission control protocol (TCP)/user datagram protocol (UDP) and IP headers; and payload of a process can be the sum of packet payload size of all packets of this process. Screen-off traffic can have less packets than screen-on traffic, and there can be a smaller total payload, for screen-off and for screen-on, with smaller average downlink packet payload size.

Some processes can have most of the payload transferred during screen-off sessions, which can be associated with the background behaviors of these applications getting updates from server periodically or based on push notifications initiated by the server. In terms of the % of downlink payload, some applications can have a smaller average downlink packet size, while other applications, can have an average size, indicating that most packets have a size of a maximum transmission unit (MTU). This can suggest that some processes are downloading objects with a relative large size (at least larger than a MTU of roughly 1.4 1.5 KB), while other processes are communicating with remote hosts in some protocols that have much smaller downlink payload.

Furthermore, screen-off traffic can contain significantly more bursts than screen-on traffic, although the total number of packets for screen-off traffic is smaller. For screen-off traffic, bursts are smaller in terms of the number of downlink/uplink packets and payload. In addition, the average burst session length and the IBT following bursts for screen-off traffic are both shorter than that of screen-on traffic. Consequently, when compared with screen-on traffic, screen-off bursts are smaller in size and duration and appear more often, which is more likely to incur a tail problem in cellular networks.

Individual applications can be roughly classified into two separate groups based on burst behavior analysis. The first group, can be called the Gathered group, comprising processes which have a small number of larger bursts in terms of the number of up-link/downlink packets per burst and the average downlink payload. The uplink payload for these bursts are not necessarily larger, since a small uplink payload of an HTTP request can result in a large file download. The Gathered group can also have longer average burst sessions and longer average following IBT, indicating less frequent appearance. The remaining processes can fall into the second group, called Scattered group, which can generate significantly more bursts and on average, these bursts contain less packets and smaller downlink payload. In addition, these bursts can be shorter in duration and appear more frequently.

Compared with screen-on traffic, screen-off traffic has a larger impact on the user equipment network energy E, i.e., when all screen-off traffic is removed, there is a total energy reduction. For signaling overhead S and channel scheduling delay D, the observation is similar to that of E. Comparing the Gathered group and Scattered group, the former has very small impact on E, S, and D, while the later is the opposite. For the Scattered group, a large number of small bursts can incur the tail problem and hence have a large impact on user equipment energy and signaling overhead. Based on the above analysis, screen-off traffic has a different pattern than screen-on traffic, which results in a more serious tail problem.

For fast dormancy, with reduced E, there is increased S, and D. However, for batching, all E, S, D are decreased. This is because for fast dormancy, since the user equipment demotes to RRC IDLE earlier, there can be more promotions resulting in increased S and D, while for batching, since the traffic pattern is altered, scattered packets are gathered into groups and hence there are less promotions.

There can also be other methodologies used to optimize mobile device resources including, but not limited to: request aggregation, packet data prioritization, and application management. To increase efficiencies, packet data requests can be bunched together. Consequently, the sending of the packet data can be aggregated so that the packet data is sent more efficiently. This process can reduce the number of transmissions necessary to send the packet data and thereby decrease the resources necessary to support sending of the packet data.

Packet data prioritization is yet another method which can be utilized to preserve mobile device resources. Packet data prioritization can be based on packet size, mobile device battery life, and/or application type. Furthermore, an additional condition related the display screen dormancy can be included in this process. For instance, a threshold can be set that only allows packets of a certain size to be sent when the display screen is dormant. A time threshold relating to the dormancy can also be included as a condition, where only packets greater than, less than, or equal to a threshold size are sent after the device screen has been dormant for a period of time. Conversely, packet transmission can also take place if the device is in a screen-on state or state of non-dormancy. An additional condition, which can be added to the packet data transmission process, can be associated with a specific application, which is in use. Conditions can be based on multiple application statuses. For instance, if one application is in use, a condition can mandate or prompt another application to send packet data.

An application management platform can be leveraged to control application packet data transmission by the user, prior to or during use of the applications. The application management platform can have application data associated with each application, wherein the application data is indicative of application resource utilization during screen-on, screen-off, dormant, and/or non-dormant mobile device statuses. The application management platform can also comprise application efficiency data associated with each application. An application selection process and application priority status data can be found within the application management platform. For instance, a user can select an emergency-based application such as a 911 application for the highest priority. Consequently, the emergency-based application can transmit data in any mobile device status. However, some applications can be restricted to transmit packet data during specific mobile device statuses. For example, a user may dictate that a social media based application only transmit data packets when the mobile device screen is non-dormant. Or a user my select that a social media based application only transmit data packets for a specified time length when the mobile device screen is dormant, effectively preserving mobile device resources. The user can also rely on an autonomous component of the application management platform, which can proactively activate or deactivate an application's ability to transmit packet data based on the application's resource usage and/or the mobile device's screen status.

In one embodiment, described herein is a method comprising receiving instruction data related to a display associated with a network device and determining a dormancy time associated with the display. The network device can then adjust a setting associated with the network device in response to a condition, related to the dormancy time associated with the display, being determined to have been satisfied.

According to another embodiment, a system can facilitate, receiving of resource allocation data related to a resource of a mobile device and receiving message data associated with a resource status of the resource based on a display status of a display of a mobile device. Furthermore, the system can adjust a resource allocation represented by the resource allocation data based on the message data associated with the resource status.

According to yet another embodiment, described herein is a computer readable medium that can perform the operations comprising initiating a rendering via a display comprising application data associated with a network usage of an application of a set of applications. Additionally, the computer readable medium can receive a selection of the application as a function of the network usage of the application and adjust a resource setting of the application in response to a dormancy time condition, related to a dormancy of the application, being determined to have been satisfied.

These and other embodiments or implementations are described in more detail below with reference to the drawings.

Referring now to FIG. 1, illustrated is a mobile device comprising a setting associated with a display screen. The mobile device 100 can comprise a display screen 102. The display screen 102 can have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

There can also be a time 104 associated with the display screen with regards to a setting 106 of the mobile device. For instance, a time 104 of five minutes can be set as a threshold for data packet transmissions in conjunction with the screen status. Therefore, applications running in the background can only transmit data packets for five minutes after the display screen goes dormant. Conversely, some settings 106 can be programmed to have an application begin transmitting packet data after a specific time 104 period has lapsed.

Figure 2:
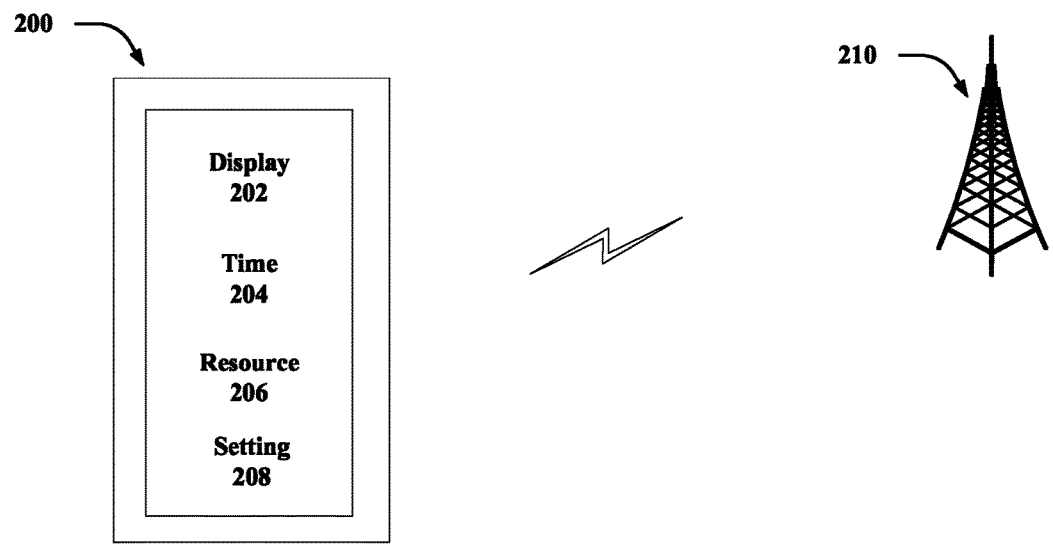
FIG. 2 illustrates a mobile device comprising a resource associated with a display screen and communicating with a network according to one or more embodiments.

Referring now to FIG. 2, illustrated is a mobile device comprising a resource associated with a display screen and communicating with a network. The mobile device 200 can comprise a display screen 202. The display screen 202 can have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

There can also be a time 204 associated with the display screen with regards to a resource 206 of the mobile device. The resource 206 can include, but is not limited to, radio resources, network energy, signaling overhead, etc. For instance, a time 204 of five minutes can be set as a threshold for data packet transmissions in conjunction with the screen status. Therefore, applications running in the background can only transmit data packets for five minutes after the display screen goes dormant. The settings 208 can also be programmed to immediately end data packet transmissions for applications running in the background, effectively preserving radio resources 206 of the mobile device. Conversely, some settings 208 can be programmed to have an application begin transmitting packet data after a specific time 204 period has lapsed.

The mobile device 200 can also communicate with a network 210 to optimize resource allocation. When the mobile device has not observed any network activity for some idle time 204, it can send a RRC message to the network 210 to make the allocated radio resource 206 be released earlier, instead of occupying the resource 206 for the whole RRC tail. After the radio resource 206 is released, the mobile device can switch to a low power idle state to conserve energy.

Figure 3:
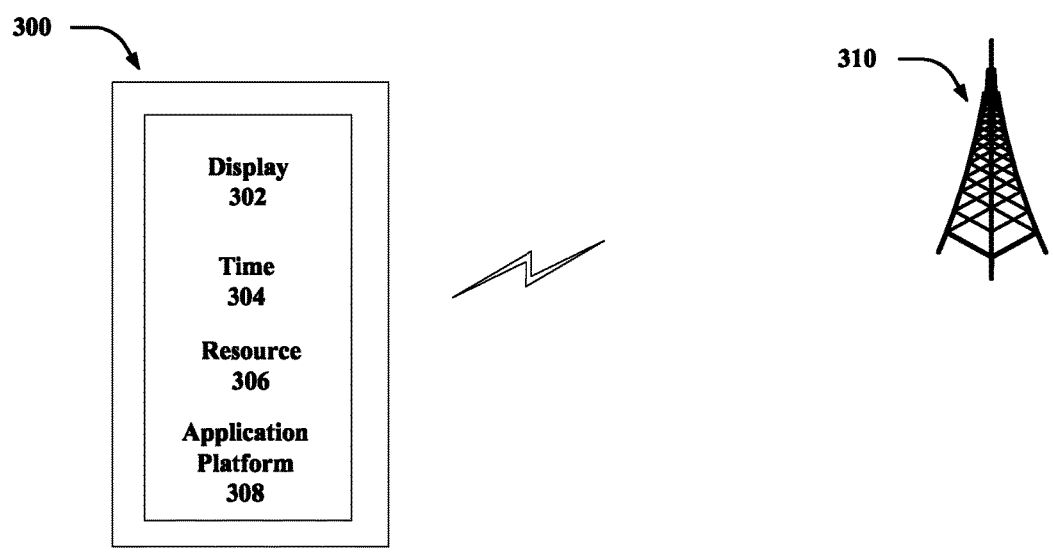
FIG. 3 illustrates a mobile device comprising an application associated with a display screen and communicating with a network according to one or more embodiments.

Referring now to FIG. 3, illustrated is a mobile device comprising an application platform associated with a display screen and communicating with a network. The mobile device 300 can comprise a display screen 302. The display screen 302 can have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

There can also be a time 304 associated with the display screen with regards to a resource 306 of the mobile device. The resource 306 can include, but is not limited to, radio resources, network energy, signaling overhead, etc. For instance, a time 304 of five minutes can be set as a threshold for data packet transmissions in conjunction with the screen status. Therefore, applications running in the background can only transmit data packets for five minutes after the display screen goes dormant. The settings can also be programmed to immediately end data packet transmissions for applications running in the background, effectively preserving radio resources 306 of the mobile device. Conversely, some settings can be programmed to have an application begin transmitting packet data after a specific time 304 period has lapsed.

The mobile device 300 can also communicate with a network 310 to optimize resource allocation. When the mobile device has not observed any network activity for some idle time 304, it can send a RRC message to the network 310 to make the allocated radio resource 306 be released earlier, instead of occupying the resource 306 for the whole RRC tail. After the radio resource 306 is released, the mobile device can switch to a low power idle state to conserve energy.

A mobile device application platform 308 can comprise application data related resource 306 allocation and transmission of data packets via each application. The mobile device application platform can allow the user to select threshold times for how each application transmits data packets with regards to the display screen status. For example an application, within the application platform 308, can be given a high priority by a user so that the application can continue to transmit packet data during a screen-off or dormant status. Furthermore, the user can allow the application platform 308 to automatically select which applications to prioritize or prevent transmissions based on aggregated application data.

Figure 4:
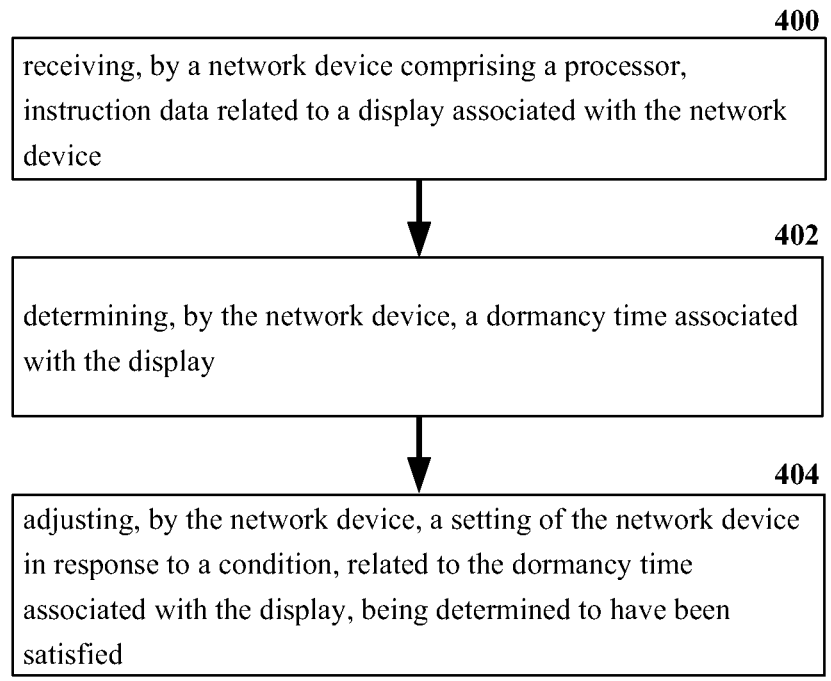
FIG. 4 illustrates a schematic system block diagram of a method for adjusting a mobile device setting based on a dormancy condition according to one or more embodiments.

Referring now to FIG. 4, illustrated is a schematic system block diagram of a method for adjusting a mobile device setting based on a dormancy condition. At element 400 instruction data related to a display associated with a network device can be receive. The network device can be any mobile device or user equipment comprising a processor. The display can comprise a screen and have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

At element 402 a dormancy time associated with the display can be determined. The dormancy time can be user generated or automatic based on data associated with a setting. Therefore, at element 404 a setting of the network device can be adjusted in response to a condition related to the dormancy time being satisfied. For example, the network device can be programmed to stop transmitting data after the display has been dormant for one minute.

Figure 5:
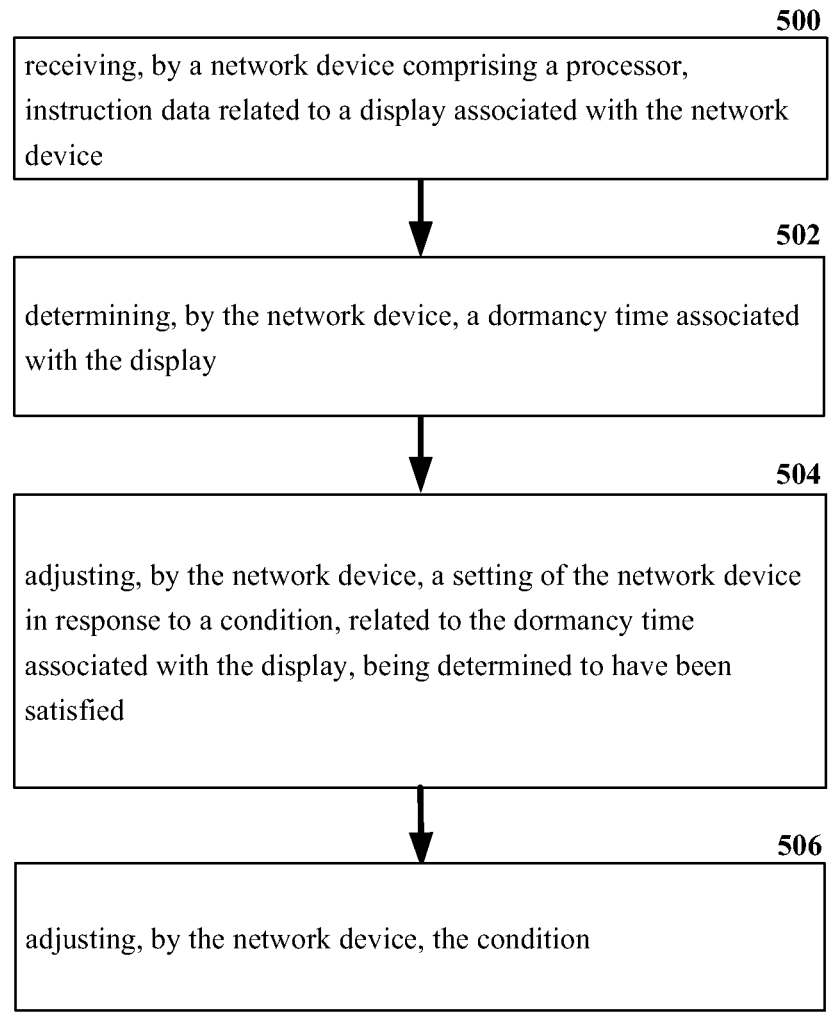
FIG. 5 illustrates a schematic system block diagram of a method for adjusting a mobile device setting based on adjusting a dormancy condition according to one or more embodiments.

Referring now to FIG. 5, illustrated is a schematic system block diagram of a method for adjusting a mobile device setting based on a dormancy condition. At element 500 instruction data related to a display associated with a network device can be receive. The network device can be any mobile device or user equipment comprising a processor. The display can comprise a screen and have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

At element 502 a dormancy time associated with the display can be determined. The dormancy time can be user generated or automatic based on data associated with a setting. Therefore, at element 504 a setting of the network device can be adjusted in response to a condition related to the dormancy time being satisfied. For example, the network device can be programmed to stop transmitting data after the display has been dormant for one minute. The condition referenced at element 504 can also be adjusted, based on resource allocation, by the network device at element 506.

Figure 6:
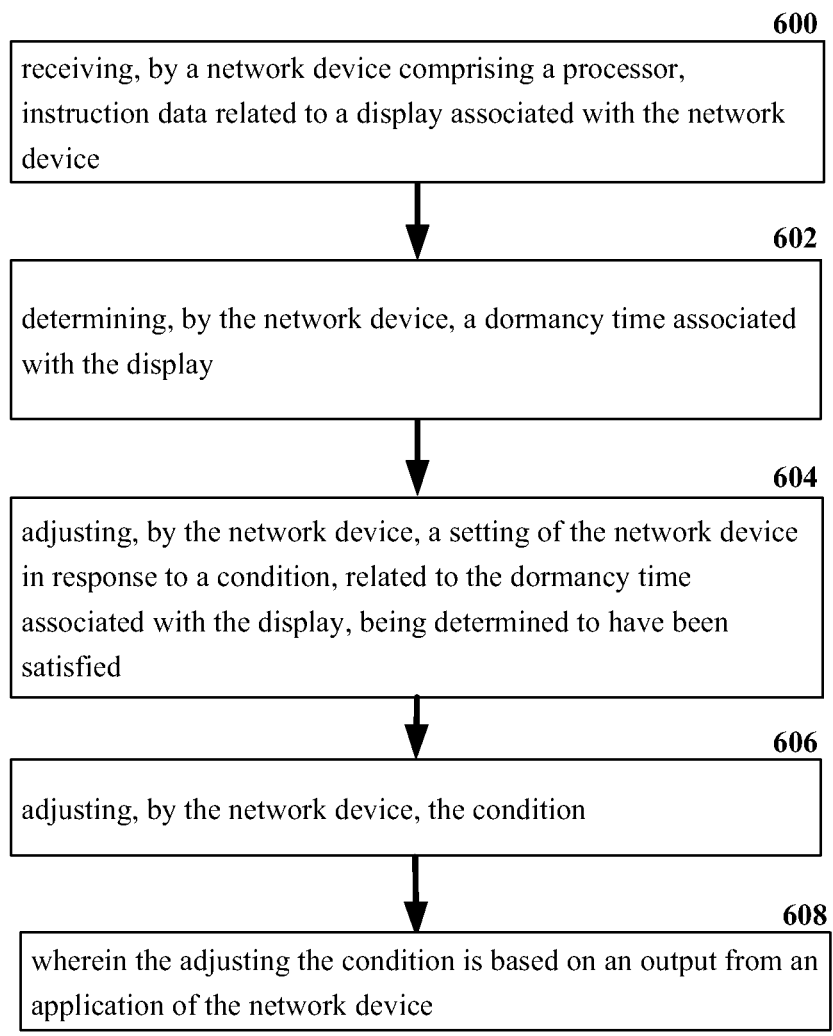
FIG. 6 illustrates a schematic system block diagram of a method for adjusting a mobile device setting based on a dormancy condition, wherein the adjusting is based on an application output according to one or more embodiments.

Referring now to FIG. 6, illustrated is a schematic system block diagram of a method for adjusting a mobile device setting based on a dormancy condition, wherein the adjusting is based on an application output. At element 600 instruction data related to a display associated with a network device can be receive. The network device can be any mobile device or user equipment comprising a processor. The display can comprise a screen and have several statuses associated therewith including, but not limited to, screen-on, screen-of, dormant, non-dormant, etc. The screen-on status can comprise a visual display, whereas the screen-of status can comprise no display. The dormant status can mean that there is no current user interaction with the screen, whereas the non-dormant status can indicate that there is current user interaction with the screen. Furthermore, there can be a hybrid status indicating that the display screen is on, however there is no user interaction with the display screen so it is dormant.

At element 602 a dormancy time associated with the display can be determined. The dormancy time can be user generated or automatic based on data associated with a setting. Therefore, at element 604 a setting of the network device can be adjusted in response to a condition related to the dormancy time being satisfied. For example, the network device can be programmed to stop transmitting data after the display has been dormant for one minute. The condition referenced at element 604 can also be adjusted, based on resource allocation, by the network device at element 606. The adjusted condition referenced at element 606 can also be adjusted based on an output from an application of the network device at element 608.

Figure 7:
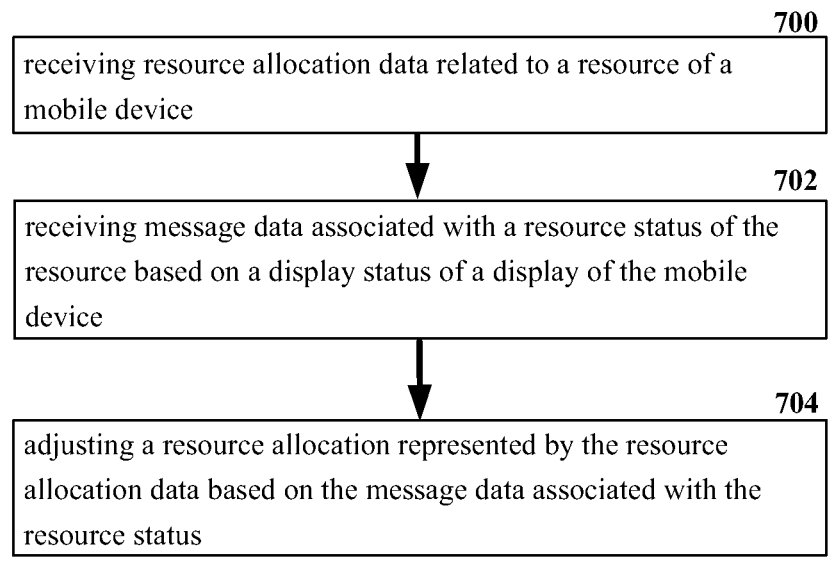
FIG. 7 illustrates a schematic system block diagram of a system for adjusting a resource allocation based on message data according to one or more embodiments.

Referring now to FIG. 7, illustrated is a schematic system block diagram of a system for adjusting a resource allocation based on message data. At element 700, resource allocation data related to a resource of a mobile device is received. Resources can include, but are not limited to, radio resources, network energy, signaling overhead, etc. Message data associated with a resource status of the resource based on a display status of a display of the mobile device is received at element 702. When the mobile device has not observed any network activity for some idle time, it can send a RRC message to a network to request that the allocated radio resource be released earlier, instead of occupying the resource for the whole RRC tail. After the radio resource is released, the mobile device can switch to a low power idle state to conserve energy by adjusting a resource allocation represented by resource allocation data based on the message data associated with the resource status at element 704.

Figure 8:
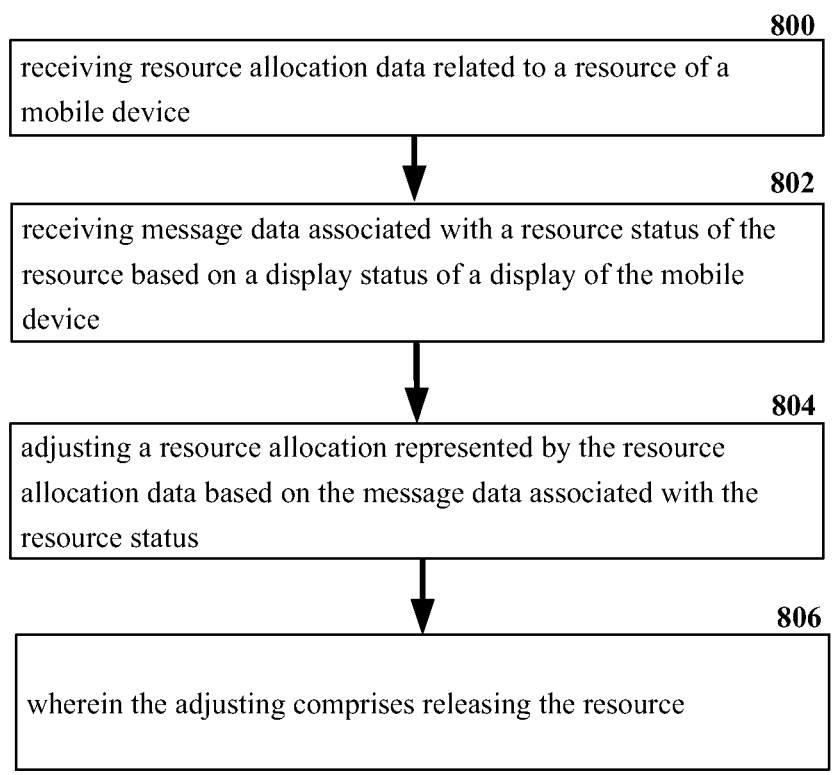
FIG. 8 illustrates a schematic system block diagram of a system for adjusting a resource allocation based on message data and releasing a resource according to one or more embodiments.

Referring now to FIG. 8, illustrated is a schematic system block diagram of a system for adjusting a resource allocation based on message data and releasing a resource. At element 800, resource allocation data related to a resource of a mobile device is received. Resources can include, but are not limited to, radio resources, network energy, signaling overhead, etc. Message data associated with a resource status of the resource based on a display status of a display of the mobile device is received at element 802. When the mobile device has not observed any network activity for some idle time, it can send a RRC message to a network to request that the allocated radio resource be released earlier, instead of occupying the resource for the whole RRC tail. After the radio resource is released, the mobile device can switch to a low power idle state to conserve energy by adjusting a resource allocation represented by resource allocation data based on the message data associated with the resource status at element 804. The adjusting at element 804 can comprise a releasing of the resource at element 806.

Figure 9:
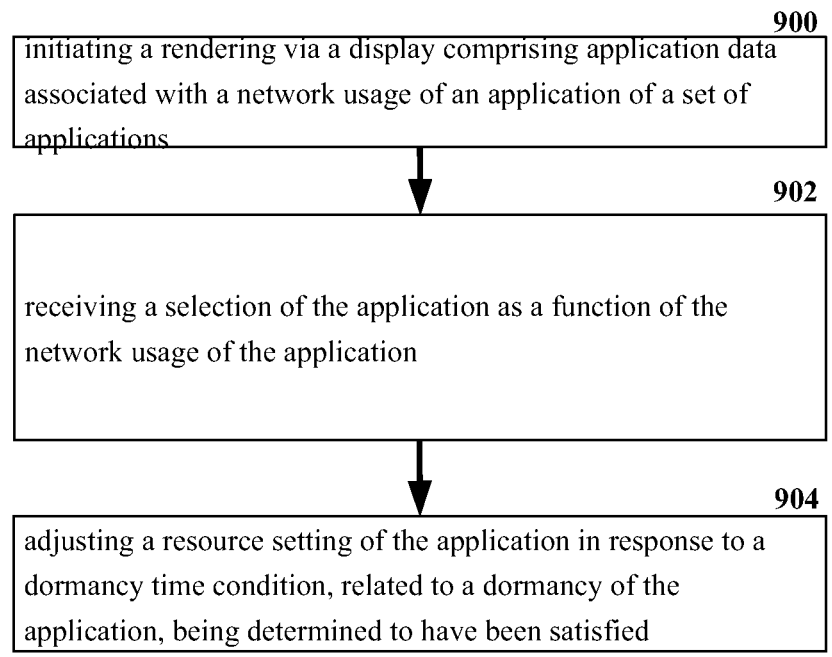
FIG. 9 illustrates a schematic system block diagram for adjusting a resource setting of an application in response to a dormancy time condition according to one or more embodiments.

Referring now to FIG. 9, illustrated is a schematic system block diagram for adjusting a resource setting of an application in response to a dormancy time condition. At element 900 a rendering via a display comprising application data associated with a network usage of an application of a set of applications can be initiated. A mobile device application platform can comprise application data related resource allocation and transmission of data packets via each application. The mobile device application platform allow the user to select threshold times for how each application transmits data packets with regards to the display screen status. For example, an application within the application platform, can be selected as a high priority by a user as a function of the network usage of the application at element 902. Furthermore, a resource setting of the application can be adjusted in response to a dormancy time condition being satisfied at element 904. The user can also allow the application platform to automatically select which applications to prioritize, or prevent transmissions, based on aggregated application data.

Figure 10:
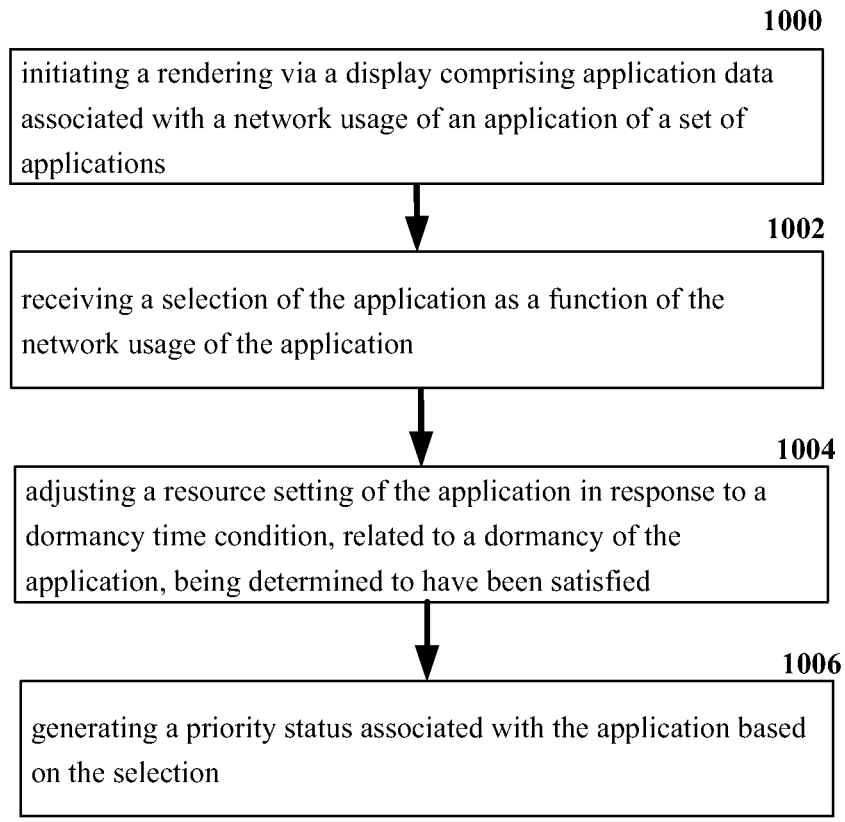
FIG. 10 illustrates a schematic system block diagram for adjusting a resource setting of an application in response to a dormancy time condition and generating an application priority status according to one or more embodiments.

Referring now to FIG. 10, illustrated is a schematic system block diagram for adjusting a resource setting of an application in response to a dormancy time condition and generating an application priority status. At element 1000 a rendering via a display comprising application data associated with a network usage of an application of a set of applications can be initiated. A mobile device application platform can comprise application data related resource allocation and transmission of data packets via each application. The mobile device application platform allow the user to select threshold times for how each application transmits data packets with regards to the display screen status. For example, an application within the application platform, can be selected as a high priority by a user as a function of the network usage of the application at element 1002. Furthermore, a resource setting of the application can be adjusted in response to a dormancy time condition being satisfied at element 1004. Within the application platform, a priority status associated with the application based on the selection can be generated at element 1006. The user can also allow the application platform to automatically select which applications to prioritize, or prevent transmissions, based on aggregated application data.

Figure 11:
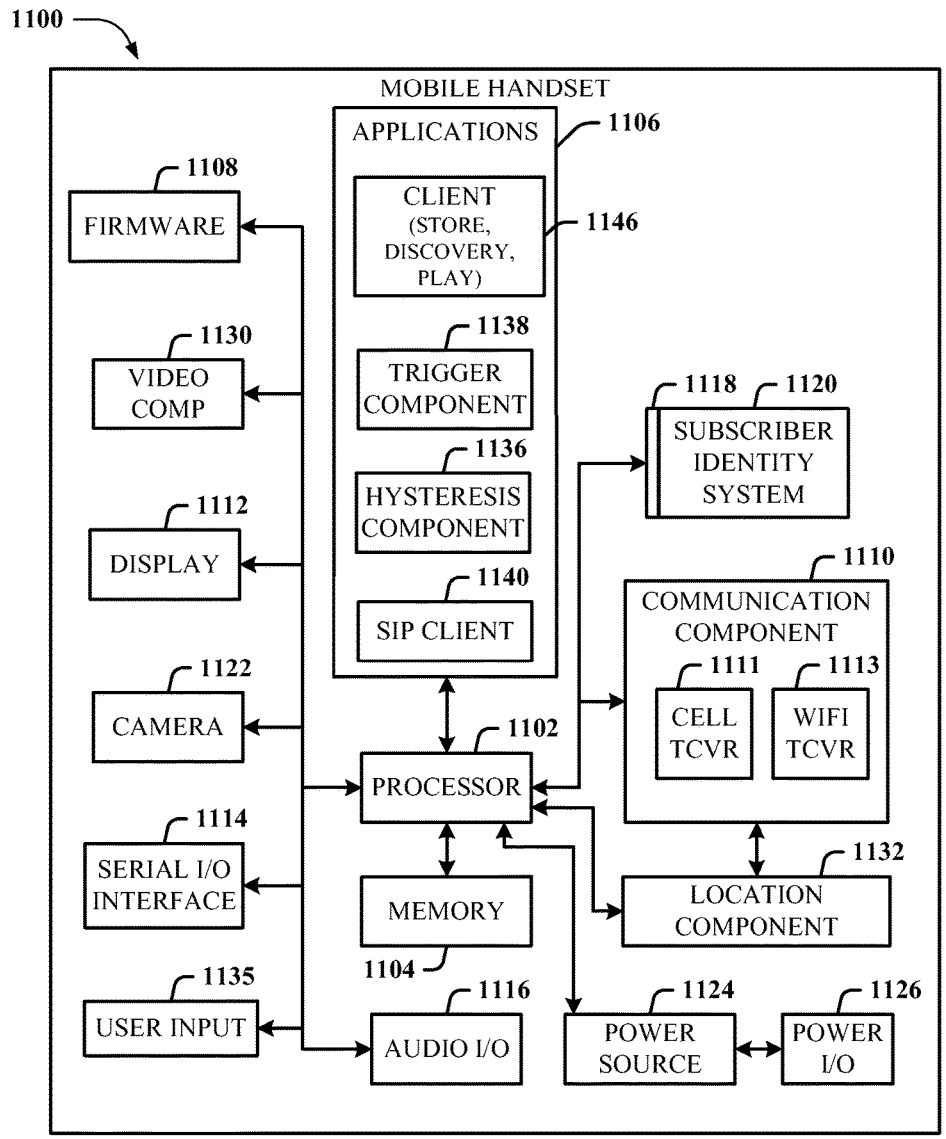
FIG. 11 illustrates a block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
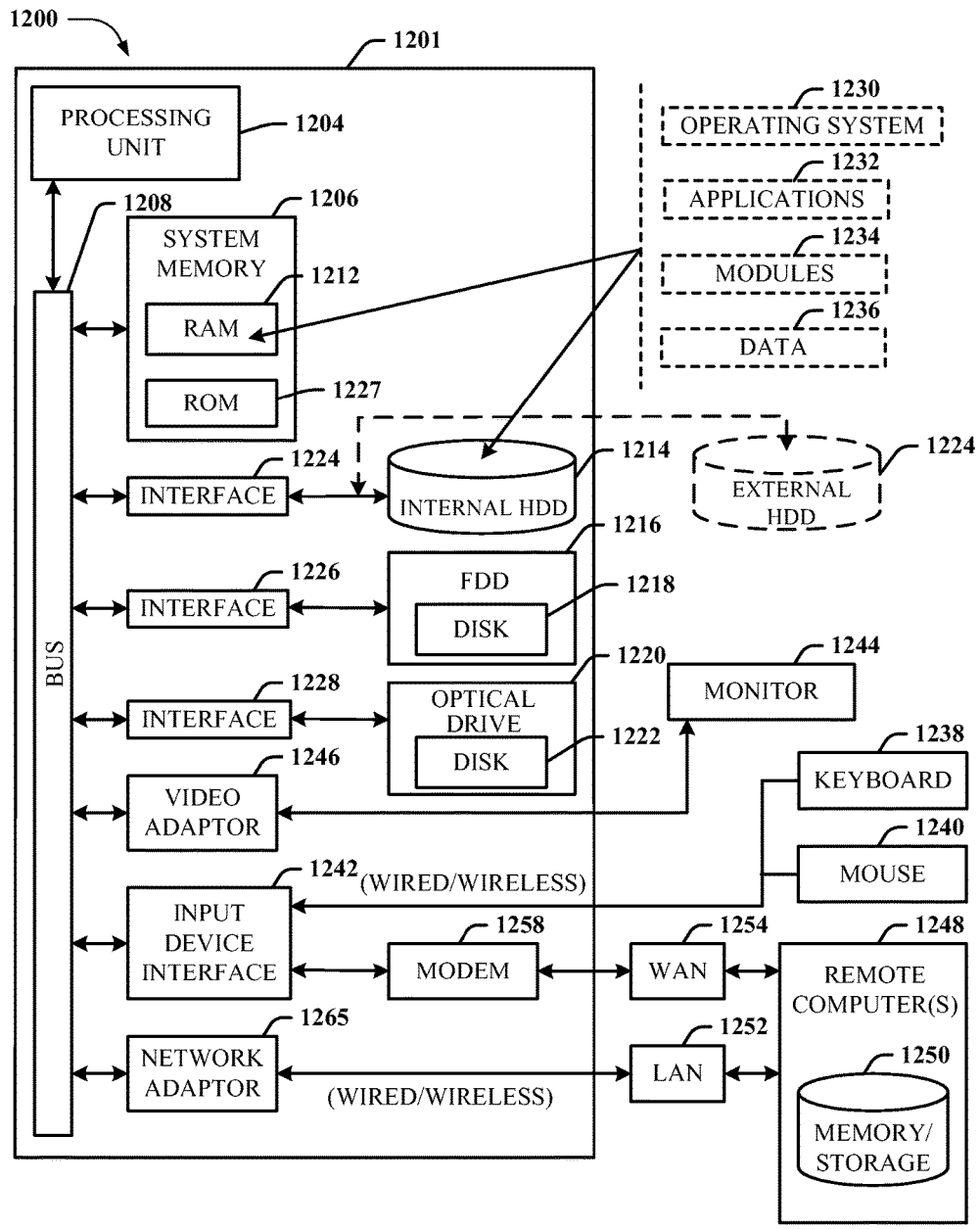
FIG. 12 illustrates a block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1211 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the serial port interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a first network device comprising a processor, instruction data related to a display associated with the first network device of a wireless network;
   determining, by the first network device, a dormancy time associated with the display;
   adjusting, by the first network device, a setting of the first network device in response to a first condition, related to the dormancy time associated with the display, being determined to have been satisfied, wherein the adjusting comprises allowing a first application to transmit first packet data during the dormancy time, and wherein the adjusting comprises, in response to the first condition being determined to have been satisfied and a second condition associated with a size of the first packet data being determined to have been satisfied, facilitating transmitting the first packet data to a second network device of the wireless network;

in response to the adjusting, sending, by the first network device, radio resource control data associated with a radio resource control message to a third network device of the wireless network to request a release of a radio resource, wherein the radio resource control message comprises request data representative of a request for the radio resource to be released at a first time prior to a second time that the radio resource was previously scheduled to be released, wherein the first time is an earlier time than the second time; and in response to the allowing the first application to transmit the first packet data during the dormancy time, prompting, by the first network device, a second application to send second packet data in addition to the first packet data.

2. The method of claim 1, further comprising:
adjusting, by the first network device, the first condition in accordance with a packet size of the second packet data.

3. The method of claim 2, wherein the adjusting the first condition is based on an output from the second application of the first network device.

4. The method of claim 1, wherein the instruction data is first instruction data, and further comprising:
based on a priority value associated with a third application, adjusting, by the first network device, the dormancy time.

5. The method of claim 1, further comprising:
classifying, by the first network device, the first packet data based on a state of the display.

6. The method of claim 5, wherein the state of the first packet data is not associated with the state of the display.

7. The method of claim 1, further comprising:
sending, by the first network device to the third network device, data related to a resource allocation of the first network device.

8. A system, comprising:
a processor; and
a memory that stores executable instructions that, when executed by the processor, facilitate performance of operations, comprising:
determining a dormancy time associated with a display screen of a first mobile device of a wireless network;
in response to a condition, related to the dormancy time, being determined to have been satisfied, facilitating an adjustment of a setting of the first mobile device, wherein the facilitating the adjustment of the setting comprises, in response to the condition being determined to have been satisfied, facilitating allowing a first application of the first mobile device to transmit first packet data to a second mobile device of the wireless network during the dormancy time;
in response to the facilitating the adjustment, transmitting radio resource control data associated with a radio resource control message to a base station device of the wireless network to request a release of a radio resource, wherein the radio resource is to be released at a first time prior to a second time that the radio resource was previously scheduled to be released, wherein the first time is an earlier time than the second time; and
based on the first application having been allowed to transmit the first packet data, facilitating a transmission of second packet data, via a second application of the first mobile device, to the second mobile device.

9. The system of claim 8, wherein the operations further comprise:
based on the transmitting the radio resource control data, facilitating the release of the radio resource associated for the first mobile device.

10. The system of claim 9, wherein the operations further comprise:
in response to the facilitating the release of the radio resource, updating a radio resource status, associated with the radio resource, to reflect that the radio resource is no longer in use by the first mobile device.

11. The system of claim 8, wherein the operations further comprise:
in response to a dormancy condition, related to a dormancy of the display screen of the first mobile device, being determined to have been satisfied, facilitating receiving message data related to a release of a resource of the first mobile device.

12. The system of claim 11, wherein the operations further comprise:
based on a state of the display screen of the first mobile device, facilitating classifying packet data associated with the first mobile device.

13. The system of claim 11, wherein the resource is associated with execution of the first application of the first mobile device.

14. The system of claim 8, wherein the operations further comprise:
in response to adjusting a resource allocation of the first mobile device, facilitating updating a display status associated with the display screen of the first mobile device.

15. A non-transitory machine-readable storage medium, comprising executable instructions that, when executed by a processor, facilitate performance of operations, comprising:
in response to a first dormancy time associated with a display screen of a first mobile device being determined to have been satisfied, facilitating receiving display data associated with the display screen;
based on the first dormancy time, facilitating adjusting a setting of the first mobile device, wherein the facilitating the adjusting comprises prompting a first application of the first mobile device to transmit first packet data to a second mobile device during a second dormancy time in response to the first dormancy time being determined to have been satisfied and a condition associated with a size of the first packet data being determined to have been satisfied;
in response to the facilitating the adjusting, transmitting, from the first mobile device to a base station device, radio resource control data associated with a radio resource control message for a request to release a radio resource at a first time prior to a second time that the radio resource was previously scheduled to be released, wherein the first time is an earlier time than the second time; and
in response to the prompting the first application to transmit the first packet data to the second mobile device during the second dormancy time, prompting, a second application to send second packet data during the second dormancy time.

16. The non-transitory machine-readable storage medium of claim 15, wherein the operations further comprise:

in response to the prompting the first application, generating a priority status associated with the first application.

17. The non-transitory machine-readable storage medium of claim 15, wherein the operations further comprise:
in response to the prompting the second application, increasing the first dormancy time from a third time to a fourth time.

18. The non-transitory machine-readable storage medium of claim 15, wherein the operations further comprise:
based on a priority value associated with a third application, adjusting the first dormancy time.

19. The non-transitory machine-readable storage medium of claim 15, wherein the operations further comprise:
based on a status of the display screen, classifying packet data associated with the second application.

20. The non-transitory machine-readable storage medium of claim 15, wherein the operations further comprise:
in response to the prompting the second application to send second packet data, updating a resource status associated with a resource being utilized by the mobile device.

* * * * *